(12) United States Patent
Wild et al.

(10) Patent No.: US 7,157,513 B2
(45) Date of Patent: Jan. 2, 2007

(54) HYDROPHILIC ADDITIVES

(75) Inventors: Christine Wild, Hilden (DE); Raymond Mathis, Duesseldorf (DE); Paul Birnbrich, Solingen (DE); Petra Padurschel, Mettmann (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 37 days.

(21) Appl. No.: 10/477,904

(22) PCT Filed: May 7, 2002

(86) PCT No.: PCT/EP02/05010

§ 371 (c)(1), (2), (4) Date: Nov. 14, 2003

(87) PCT Pub. No.: WO02/092891

PCT Pub. Date: Nov. 21, 2002

(65) Prior Publication Data

US 2004/0138360 A1    Jul. 15, 2004

(30) Foreign Application Priority Data

May 16, 2001 (DE) ................................ 101 23 863

(51) Int. Cl.
- *C08K 5/103* (2006.01)
- *C08K 5/06* (2006.01)
- *B32B 23/16* (2006.01)
- *C07C 69/347* (2006.01)

(52) U.S. Cl. ...................... 524/375; 524/306; 524/318; 524/320; 524/321; 524/322; 428/375; 428/393; 560/129; 560/1

(58) Field of Classification Search ................ 580/129; 524/307, 306, 318, 320, 321, 322, 366, 375; 428/375, 393

See application file for complete search history.

(56) References Cited

U.S. PATENT DOCUMENTS

| | | | |
|---|---|---|---|
| 3,957,712 A | | 5/1976 | Heyden et al. |
| 4,873,271 A | * | 10/1989 | Lundy et al. ................ 523/136 |
| 5,030,280 A | * | 7/1991 | Hoefer et al. .................. 106/13 |
| 5,118,324 A | * | 6/1992 | Uchida ........................... 8/543 |
| 5,439,734 A | * | 8/1995 | Everhart et al. ............. 442/400 |
| 6,699,922 B1 | | 3/2004 | Birnbrich et al. |

FOREIGN PATENT DOCUMENTS

| | | | |
|---|---|---|---|
| DE | 1 296 803 | * | 6/1969 |
| DE | 12 96 803 | | 6/1969 |
| DE | 23 43 198 | | 3/1975 |
| DE | 100 155 54 | | 10/2001 |
| EP | 0 073 479 | | 3/1983 |
| JP | 61-123652 | * | 6/1986 |
| WO | WO 95/10648 | | 4/1995 |
| WO | WO 01/75199 | | 10/2001 |

OTHER PUBLICATIONS

JP 61-123652 (abstract in English).*
Ullmann's Encyclopedia of Industrial Chemistry, vol. A 17, VCH Weinheim, 1994, pp. 572-581.

* cited by examiner

*Primary Examiner*—David W. Wu
*Assistant Examiner*—Rip A. Lee
(74) *Attorney, Agent, or Firm*—John F. Daniels; Danel S. Ortiz

(57) ABSTRACT

The invention relates to hydrophilic additives for synthetic fibres containing polyolefin; said additives are represented by general formula (I): A—B—C—B—A wherein A is a radical R—COO, wherein R represents a saturated, cross-linked or non-cross-linked alkyl radical having 7–21 C atoms, B represents a group $(C_nH_{2n}O)_k$, wherein n is a whole number from 2–4 and k can have a value of 1–15, C represents a linear or cross-linked alkylene radical having at least 2 and at the most 6 C atoms and the radical C can be, optionally, interrupted by oxygen atoms.

22 Claims, No Drawings

HYDROPHILIC ADDITIVES

BACKGROUND OF THE INVENTION

This application is a 371 of PCT/EP02/05010 filed May 7, 2002.

This invention relates to additives for the permanent internal hydrophilicization of polyolefin-containing materials, preferably polypropylene fibers.

In many cases, the surface of plastic products has to be provided with special effects which either can only be produced incompletely, if at all, during molding for technical reasons or can only be produced unfavorably for economic reasons. One such effect, for example, is the improvement of wettability with polar liquids, such as water. Technical applications in this respect include, for example, the production of hygiene articles.

In the production of hygiene articles, such as diapers or sanitary napkins, and also wiping cloths or "geofleeces", absorbent materials are used to take up aqueous liquids. In order to prevent direct contact with the absorbent material during wear and to increase wearing comfort, this material is enveloped in a thin water-permeable nonwoven. Such nonwovens are normally made from synthetic fibers, such as polyolefin or polyester fibers, because these fibers can be inexpensively produced, show good mechanical properties and are heat-resistant. However, untreated polyolefin or polyester fibers are not suitable for this application because they are not sufficiently permeable to water-containing fluids on account of their hydrophobic surface.

In principle, the fibers can be given the necessary hydrophilic properties by subsequent coating with corresponding finishes (external additives) or can be made sufficiently hydrophilic by the incorporation of suitable additives (internal additives) during their production. The second of these two options is described in WO 95/10648 which discloses diesters of polyethylene glycol with fatty acids or derivatives thereof as suitable permanent additives. In the Examples, reaction products of oleic acid with polyethylene glycol having a molecular weight of 400 are described as particularly advantageous. Applicants' hitherto unpublished DE 100 155 54 describes reaction products of two parts lauric acid with polyethylene glycols which are suitable as internal additives for hydrophilicizing polyolefin fibers.

Additives such as these are generally processed with polyolefin granules to form a masterbatch which is then added as such to the polymer granules before processing to the fibers or other end products, followed by extrusion. However, it is desirable for reasons of cost to be able to incorporate such additives during the actual extrusion process in the extruder. Unfortunately, attempts to incorporate known additives by direct addition have been frustrated by problems attributable to the low-temperature stability of the additives. The compounds have cold cloud points above 20° C. Accordingly, when they are incorporated by direct addition, the compounds crystallize out and block the dies.

Accordingly, the problem addressed by the present invention was to provide additives for the permanent hydrophilicization of polyolefin fibers which would not have any of the disadvantages mentioned above. These additives would be capable of providing the fibers or products with sufficient hydrophilia which they would retain even under stress, for example after the repeated wetting with water which they undergo in washing processes.

DETAILED DESCRIPTION OF THE INVENTION

It has been found that certain oligomeric esters exhibit the required properties.

In a first embodiment, the present invention relates to internal hydrophilicizing additives for synthetic polyolefin-containing fibers which correspond to general formula (I):

$$A—B—C—B—A \quad (I)$$

where A represents a group R—COO in which R is a saturated, branched or unbranched $C_{7-21}$ alkyl group, B represents a group $(C_nH_{2n}O)_k$ in which n is an integer of 2 to 4 and k has a value of 1 to 15, and C is a linear or branched alkylene group containing at least 2 and at most 6 carbon atoms which may also be interrupted by oxygen atoms. The index k relates to the individual group B and does not indicate the total number of groups B in the molecule. The index k varies on account of the varying, technically related degrees of alkoxylation of the individual molecules and, accordingly, may also be an odd number.

The compounds corresponding to general formula (I) are obtained, for example, by reaction of diols, for example polyalkylene glycols, with alkoxides and with saturated fatty acids. On the one hand, diols containing 2 to 6 carbon atoms, which form structural unit C of the additives according to the invention, and ethylene, propylene and/or butylene oxide which form the groups B in the compounds according to the invention must be present. The free hydroxyl groups of the alkoxides are terminated by saturated $C_{8-22}$ fatty acids.

The diols are preferably selected from the group consisting of ethane-1,2-diol, propane-1,2-diol, propane-1,3-diol and butane-1,4-diol. In principle, mixtures of the diols may also be used although it has proved to be of advantage to use only one diol for the reaction. Depending on the diol with which the synthesis process was started, the compounds (I) obtained contain different groups C. This difunctional group is preferably a $CH_2$—$CH_2$, $CH_2$—$CH(CH_3)$, $CH_2$—$CH_2$—$CH_2$ or $(CH_2)_4$ group.

However, it can also be of advantage for the group C to contain one or more oxygen atoms. This preferably applies to an additive started on the basis of diethylene glycol, dipropylene glycol or similar ether compounds. In this case, C in formula (I) is a difunctional group $CH_2$—$CH_2$—O—$CH_2$—$CH_2$—O or $(CH_2)_3$—O—$(CH_2)_3$—O.

The alkoxides are selected from the group consisting of ethylene oxide, propylene oxide and butylene oxide and mixtures thereof. If alkoxides of different types are reacted, the alkoxylation reaction may be carried out both blockwise and at random. The number of alkoxide units in the compounds of formula (I) varies from 2 to 30 so that k may assume a value of 1 to 15. Preferred compounds of formula (I) are those in which k has a value of 2 to 15, preferably 4 to 10 and more particularly 10 or 5. Other preferred compounds of formula (I) also contain ethylene oxide units as the group B, preferably only ethylene oxide units. However, compounds containing only propylene oxide groups may also be used. In addition, mixed alkoxylates, preferably ethylene oxide and propylene oxide groups, are preferred. In these cases, the number of ethylene oxide groups should at least be equal to the number of propylene oxide groups (PO) and an excess of ethylene oxide groups (EO) should preferably be present. EO PO ratios of 5:1 to 2:1 are preferred.

Suitable saturated fatty acids which can form group A of the compounds according to the invention are preferably selected from the group consisting of octanoic acid, nonanoic acid, decanoic acid, undecanoic acid, dodecanoic aid, tridecanoic acid, tetradecanoic acid, pentadecanoic acid, hexadecanoic acid, heptadecanoic acid and octadecanoic acid; nonadecanoic acid, eicosanoic acid and heneicosanoic acid; and docosanoic acid. Compounds corresponding to formula (I), in which R is a saturated $C_{9-13}$ or $C_{9-11}$ alkyl group, are preferred. Compounds corresponding to formula (I) based on decanoic acid ($C_{10}$) and undecanoic acid ($C_{11}$) are most particularly preferred.

Unsaturated acids may also be used although compounds of formula (I) of which the substituents have unsaturated functionalities do show inadequate oxidation stability.

In order to overcome the problems mentioned above, the compounds corresponding to formula (I) should preferably have a cold cloud point below 20° C. In the context of the present invention, the cold cloud point is determined as follows to DIN EN 23015: a test tube containing a low-temperature thermometer and the product to be tested is placed in a cooling solution (ethylene glycol/water ca. 1:1, ca. −20° C. from a refrigerator) and cooled until distinctly visible clouding occurs. The temperature at which the product is completely clear again is then determined by stirring with the thermometer at room temperature (21° C.).

Preferred compounds of formula (I) have a cold cloud point below 12° C., preferably below 10° C. and more particularly below 6° C. It is of particular advantage to use compounds of formula (I) which have a cold cloud point below 5° C. and more particularly below 3° C.

Preferred compounds of formula (I) suitable as additives in accordance with the invention are those in which R is a linear alkyl group containing 9 carbon atoms, k has a value of 5, n has a value of 2 and C is a group $CH_2$—$CH(CH_3)$ or in which R is a linear alkyl group containing 11 carbon atoms, k has a value of 5, n has a value of 2 and C is a group $CH_2$—$CH_2(CH_3)$. Other preferred hydrophilicizing additives are compounds (I) in which A is a group R—COO, where R is a saturated, branched or unbranched $C_{7-21}$ alkyl group, B is a group $C_3H_6$ and C is a group $CH_2$—$CH_2$—O—$CH_2$—$CH_2$—O. Another preferred additive of formula (I) contains a diethylene glycol residue as part C, 5 to 7 parts EO and 2 to 4 parts PO as the groups B and a lauric acid residue as the substituent R.

The additives according to the invention may be used on their own or in admixture with one another. In addition, other additives known from the prior art for the extrusion or production of polymers may be added.

According to the invention, the additives are used for permanent hydrophilicization in polyolefin-containing materials, preferably fibers, sheet-form materials, such as nonwovens, films and foams.

The additives according to the invention are preferably used in nonwovens and foams. As generally known among experts, foams are plastics which can be charged with additives by virtue of the cells present inside. Charging should be carried out simply by adding at least one additive to the plastic foam according to the invention, which represents a porous carrier material, and mixing it with the foam at a temperature below the melting point of the basic polymer used for the production of the plastic foam, but above the melting point of the additive. The additive flows into the cells inside the plastic foam, i.e. the plastic foam by virtue of its special structure absorbs the liquid additives like a sponge.

Suitable polyolefin-containing materials are any known polymers and copolymers based on ethylene or propylene. Mixtures of pure polyolefins with copolymers are also suitable in principle. The hydrophilicizing additives may also be used in mixtures of polyolefins with other synthetic or natural polymers, for example cellulose or hemp, in order to provide the polyolefin fibers with permanently hydrophilic properties.

Polymers particularly suitable for the purposes of the teaching according to the invention are listed below: poly (ethylenes), such as HDPE (high-density polyethylene), LDPE (low-density polyethylene), VLDPE (very-low-density polyethylene), LLDPE (linear low-density polyethylene), MDPE (medium-density polyethylene), UHMPE (ultra high molecular polyethylene), VPE (crosslinked polyethylene), HPPE (high-pressure polyethylene); poly(propylenes), such as isotactic polypropylene; syndiotactic polypropylene; Metallocen-catalyzed polypropylene, high-impact polypropylene, random copolymers based on ethylene and propylene, block copolymers based on ethylene and propylene; EPM (poly[ethylene-co-propylene]); EPDM (poly[ethylene-co-propylene-co-unconjugated diene]).

Other suitable polymers are: poly(styrene); poly(methylstyrene); poly(oxymethylene); Metallocen-catalyzed α-olefin or cycloolefin copolymers, such as norbornene/ethylene copolymers; copolymers containing at least 60% ethylene and/or styrene and less than 40% monomers, such as vinyl acetate, acrylates, methacrylates, acrylic acid, acrylonitrile, vinyl chloride. Examples of such polymers are: poly(ethylene-co-ethyl acrylate), poly(ethylene-co-vinyl acetate), poly (ethylene-co-vinyl chloride), poly(styrene-co-acrylonitrile). Also suitable are graft copolymers and polymer blends, i.e. mixtures of polymers in which the above-mentioned polymers inter alia are present, for example polymer blends based on polyethylene and polypropylene.

Homopolymers and copolymers based on ethylene and propylene are particularly preferred for the purposes of the present invention. In one embodiment of the present invention, therefore, polyethylene on its own is used as the polyolefin; in another embodiment, polypropylene on its own is used as the polyolefin and, in a further embodiment, ethylene/propylene copolymers are used as the polyolefin.

In one particularly preferred embodiment of the invention, the additives are used in polypropylene fibers. Such fibers preferably have a melt flow rate of greater than 10 to 1,500 dg/min. (as measured at 230° C./2.16 kg load). Preferred fibers can have melt flow rates of, for example, 150 to 1,200 or 20 to 25 or 400 to 1,000 dg/min.

In a second embodiment, the present invention relates to a process for the production of hydrophilicizing additives corresponding to formula (I) for synthetic polyolefin-containing fibers, characterized in that a diol selected from the group consisting of ethane-1,2-diol, propane-1,2-diol, propane-1,3-diol and butane-1,4-diol or diethylene glycol or dipropylene glycol is reacted with alkoxides selected from the group consisting of ethylene oxide, propylene oxide and/or butylene oxide and the resulting reaction product is esterified with a saturated, linear or branched fatty acid containing 8 to 22 carbon atoms. Mixed-alkoxylated products preferably containing ethylene oxide and propylene oxide groups are preferably used for the purposes of the teaching of the invention. Additives of formula (I), in which C is an alkylene group interrupted by oxygen atoms and G is a $C_3H_6$ group, are particularly preferred. In compounds such as these, C is preferably a diethylene glycol residue and A is a defined above.

The use of the compounds of formula (I) according to the invention as internal additives in polyolefin-containing fibers leads to improved hydrophilicization of the fibers, good water absorption being obtained at the same time. Accordingly, fibers with additives thus internally incorporated are suitable for a number of technical applications, more particularly in the field of hygiene nonwovens and wiping cloths.

The present invention also relates to a process for the production of articles completely or partly containing polyolefins, characterized in that compounds corresponding to formula (I) are added to polymer granules completely or partly containing polyolefins in quantities of 0.1 to 5% by weight, based on the granules, followed by processing in known manner to fibers or films, preferably by extrusion.

It has proved to be of advantage to aftertreat the extruded additive-containing fibers or films with water. This aftertreatment should preferably be carried out directly and immediately after the extrusion step in order to achieve optimal hydrophilicization. The treatment with water is preferably carried out by contacting the extruded products with water at 80 to 90° C. This can be done by spraying, immersion or via kiss rollers. The products may also be treated with steam, preferably superheated steam. The treated products are then dried.

The articles, preferably fibers or films or sheet-form materials, such as nonwovens, of these fibers contain the additives in quantities of preferably 0.1 to 5% by weight, more preferably 0.5 to 5% by weight and most preferably 1.0 to 2.5% by weight, based on the total weight of the articles.

The present invention also relates to the use of the compounds corresponding to formula (I) as internal hydrophilicizing additives in polyolefin-containing fibers or sheet-form materials, more particularly in nonwovens. Although the compounds of formula (I) may also be used as external additives, i.e. for example as constituents of an externally applied finish, this is not the subject of the present application.

Nonwovens can be produced by any of the methods for producing nonwovens known in the prior art as described, for example, in Ullmann's Encyclopedia of Industrial Chemistry, Vol. A 17, VCH Weinheim 1994, pages 572–581. Nonwovens produced by the dry-laid process or by the spunbond process or by the melt flow process are preferred. The dry-laid process starts out from staple fibers which are normally first separated into individual fibers by carding and are then laid together to form the unstabilized nonwoven using an aerodynamic or hydrodynamic process. The unstabilized nonwoven is then heat-treated ("thermobonded") to give the final nonwoven. To this end, the synthetic fibers are either heated to the extent that their surface melts and the individual fibers are joined together at their points of contact or the fibers are coated with an additive which melts during the heat treatment and thus bonds the individual fibers together. The individual bonds are fixed by cooling. Besides this process, any other processes used in the prior art for bonding nonwovens may of course also be used. By contrast, the spunbond process starts out from individual filaments formed by melt-spinning from extruded polymers which are forced under high pressure through spinning jets. The filaments issuing from the spinning jets are bundled, stretched and laid to form a nonwoven which is normally stabilized by thermobonding.

EXAMPLES

Synthesis of the Additives

General synthesis procedure for additives 1–4 according to the invention: X mol fatty acid are reacted with y mol diol under nitrogen at 240° C. in the presence of 0.5% $H_3PO_2$ (50%). When water stops distilling over, the temperature is reduced to 100° C. and a vacuum (15 mbar) is applied. When the acid value remains constant for an hour, the reaction may be terminated. To this end, the $H_3PO_2$ is neutralized with a twofold excess of anhydrous sodium carbonate at 80° C. (ca. 30 mins.). The salts are then filtered off with the assistance of a filter aid (Hyflo Celite).

Additive 1

2.05 mol dodecanoic acid are reacted with 1.00 mol propane-1,2-diol×10 EO for 9 h by the procedure described above. Acid value 1.7, OH value 7.9.

Additive 2

2.05 mol dodecanoic acid are reacted with 1.00 mol propane-1,2-diol×12 EO for 9 h by the procedure described above. Acid value 1.5, OH value 6.6.

Additive 3

1.95 mol dodecanoic acid are reacted with 1.00 mol propane-1,3-diol×10 EO for 8 h by the procedure described above. Acid value 1.5, OH value 11.4.

Additive 4

2.00 mol dodecanoic acid are reacted with 1.00 mol propane-1,3-diol×10 EO for 7 h by the procedure described above. Acid value 1.6, OH value 15.2.

Wetting Test

The effectiveness of additives 1 to 4 according to the invention in polypropylene granules was demonstrated by the wetting test described below.

1. 600 g of high molecular weight polypropylene granules (commercial product "Eltex PHY 671" of Solvay) are mixed with 9.0 g (=1.5% by weight) of the substance to be tested for hydrophilic finishing. This mixture is introduced into an extruder (DSK 42/7 twin-screw extruder of Brabender OHG, Duisburg) through a hopper. As well-known to the expert, an extruder is a machine for processing plastics which is suitable for continuously mixing and plasticizing both powder-form and granular thermoplastics. Beneath the feed hopper, there is a contra-rotating twin screw longitudinally divided into three heating zones in addition to a water-cooling system which is intended to prevent premature melting of the granules or powder. The temperature of the heating zones and the rotational speed of the twin screw can be controlled through a data-processing Plast-Corder PL 2000 which is connected to the extruder via a PC interface. Heating zones I, II and III are each heated to a temperature of 200° C., the three heating zones being air-cooled to keep the temperature constant. The mixture of polypropylene granules and test substance is automatically taken into the extruder by the contra-rotating twin screw and transported along the screw. The rotational speed is 25 r.p.m. to guarantee thorough compounding and homogenization. The resulting homogeneous mixture finally enters a nozzle which represents a fourth heating zone. The temperature of the nozzle is adjusted to 200° C., i.e. the mixture leaves the extruder at that temperature. The extrusion die is so selected that the mean diameter of the strand after leaving the die is of the order of 2–3 mm. The strand is granulated, i.e. chopped into small pieces between about 2 and 4 mm in length. The granules obtained are cooled to 20° C. The granules are gravimetrically converted (i.e. by the force of gravity) into fibers in a melt spinning machine at a processing temperature of 280° C. (i.e. both the melt star temperature and the temperature of the spinning jet are adjusted to 280° C.). The fibers obtained have a denier of about 10 to 30 dtex (1 dtex corresponds to 1 g of fibers per 10,000 m fiber length). 500 m of these fibers are then wound into a roll with a diameter of 6.4 cm. The fiber wound into the roll is removed from the roll and the circular figure removed is stabilized by knotting at its center to form a figure-of-eight; this is referred to hereinafter as the "skein".

2. A 1 liter measuring cylinder (glass cylinder with an internal diameter of 6.0 cm) is filled with distilled water at 20° C. to the 1000 ml mark. The skein to be tested is then held in such a way that its longitudinal axis coincides with the vertical of the measuring cylinder, i.e. the skein appears as a vertical "8". A weight consisting of copper wire is then attached to the lowermost part of the "8", the weight of the copper wire being 0.2064 g per gram of skein. The copper wire is attached in the form of coils to the skein, the coil diameter of the copper wire being about 1 to 2 cm. The coils of copper wire are then pressed together by gentle compression between the thumb and index finger. The skein with the copper weight is then held over the water surface of the measuring cylinder in such a way that the lower part of the copper weight dips into the water and the lowermost part of the skein is about 2 mm above the water surface. The skein is then released and the time in seconds it takes the skein to sink into the water past its upper edge is measured with a stopwatch (complete immersion time). The beginning and end of the measuring time are defined by the lowermost end of the skein and also its upper end passing the 1000 ml mark. This first measured value is called the C1 value ("value of the first wetting cycle").

3. Immediately after determination of the C1 value, the skein is removed from the measuring cylinder, dabbed with cellulose and dried for 1 hour at 40° C. in a recirculating air drying cabinet (Heraeus type UT 5042 EK). Step 2 is then repeated. The resulting value in seconds of the complete immersion time is called the C2 value ("value of the second wetting cycle"). Drying and determination of the complete immersion time are then repeated again, the C3 value ("value of the third wetting cycle") being obtained. If the complete immersion times (C1 to C3 values) are above 180 seconds, the particular cycle is terminated.

Results

The individual wetting test is passed if the values for C1 to C3 are under 5 seconds. The test results are set out in Table 1 for the additives according to the invention and in Table II for known additives. The cold cloud points are set out in Table III.

TABLE I

Sink test with PP skeins containing additives according to the invention

| No. | Additive | Skein weight in g | Cu sink weight in g | Sink weight/ skein factor | Sink time C1 in s | Sink time C2 in s | Sink time C3 in s |
|---|---|---|---|---|---|---|---|
| 1 | POE(10) propane-1,2-diol didodecanoate | 1.5780 | 0.3263 | 0.2068 | 1.00 | 1.00 | 1.50 |
| 2 | POE(12) propane-1,2-diol didodecanoate | 1.3399 | 0.2768 | 0.2066 | 1.32 | 1.28 | 2.25 |
| 3 | POE(10) propane-1,3-diol didodecanoate | 1.5539 | 0.3209 | 0.2065 | 3.18 | 4.35 | 2.09 |
| 4 | POE(7) propane-1,3-diol didecanoate | 1.2807 | 0.2632 | 0.2055 | 1.18 | 1.09 | 1.59 |

For comparison, the results of the skin test for known additives according to DE 100 155 54 are set out in Table II.

TABLE II

| Additive | Skein weight in g | Cu sink weight in g | Sink weight/ skein factor | Sink time 1 in s | Sink time 2 in s | Sink time 3 in s | Sink time 4 in s | Sink time 5 in s |
|---|---|---|---|---|---|---|---|---|
| 1.5% PEG-400-dilaurate | 1.7648 | 0.3630 | 0.2057 | 1.2 | 1.2 | 1.2 | 1.2 | 1.3 |
| 1.5% PEG-400-dilaurate | 1.7758 | 0.3673 | 0.2068 | 1.2 | 1.2 | 1.2 | 1.2 | 1.3 |

TABLE III

Cold cloud points of the additives according to the invention

| Product | Cold cloud point |
|---|---|
| 1 | 2° C. |
| 2 | 5° C. |
| 3 | 3° C. |
| 4 | 3° C. |
| PEG 400 dilaurate (comparison) | Cloudy at 25° C. |

A wicking test was also carried out and the water absorption of additive-containing nonwovens was measured to demonstrate the effectiveness of the additives according to the invention. To this end, melt-blown nonwovens were produced from polypropylene (PP) fibers containing 2% by weight of internal hydrophilicizing additives.

Additive A is a diester based on PEG400 esterified with two mol lauric acid in accordance with the teaching of Applicants' WO 01/75199.

Additive B (invention) is a product started with diethylene glycol, subsequently reacted with ethylene and propylene oxide and, finally, end-capped with lauric acid. In formula (I), this corresponds to the group $CH_2CH_2$—O—$CH_2CH_2$—O for C and to the EO and PO groups for B, the molecule containing a total of 7 mol EO and 2 mol PO per mol of the additive. A is a lauric acid residue.

A nonwoven containing additive-free fibers was tested for comparison.

A. Wicking Test

Preparation:

Cutting to Size of the Nonwoven Samples
Dimensions: 225×85 mm
Number: 4
Direction: lengthwise and across Procedure:
1. Place nonwoven sample in the frame
2. Immerse nonwoven and frame in distilled water to a depth of 10 mm
3. Read off height of rise after 120 seconds Results:

| | Rise in mm |
|---|---|
| Additive A | 0 |
| Additive B | 30 |
| No additive | 0 |

The nonwovens containing the additive according to the invention show distinctly better hydrophilicization than the products containing the known additive.

B. Water Absorption

The test used in a modified EDANA test (chapter 10.1–72):

Preparation:

Cutting of the Nonwoven Samples to Size:
Dimensions: 120 mm×120 mm
Number: 3
Weight: at least 1.0 g (several nonwovens)

Procedure:
1. Weigh nonwoven samples
2. Place in distilled water for 60 secs. (weight nonwoven samples)
3. Hang vertically in machine direction and leave to drain for 120 secs.
4. Reweigh nonwoven samples
5. Leave to dry for 24 hours
6. Repeat steps 1 to 5 twice Calculate absorption (water uptake capacity)/%:

$$X\% = \frac{\text{Wet weight} - \text{dry weight}}{\text{Dry weight}} \times 100$$

The water absorption results are set out in the following Table:

| | Water absorption in % |
|---|---|
| Additive A | 1003 |
| Additive B | 935 |
| No additive | 129 |

Accordingly, the additives according to the invention show equally good water absorption to the known products and thus represent an alternative to those products.

The invention claimed is:

1. An internal hydrophilicizing additive of a formula:

A—B—C—B—A     (I)

wherein A represents a residue of fatty acid R—CO wherein R is a linear alkyl group containing 9 carbon atoms, B represents a group $(C_nH_{2n}O)_k$ in which k has a value of 5, n has a valued 2 and C is a —O—$CH_2CH(CH_3)$—O— group.

2. An internal hydrophilicizing additive of a formula:

A—B—C—B—A     (I)

wherein A represents a residue of fatty acid R—CO wherein R is a linear alkyl group containing 11 carbon atoms, B represents a group $(C_nH_{2n}O)_k$ in which k has a value of 5, n has a valued 2 and C is a —O—$CH_2CH(CH_3)$—O— group.

3. A synthetic fiber composition comprising a mixture of:
(a) a polyolefin; and
(b) an additive of the formula:

A—B—C—B—A     (I)

wherein A represents a residue of a fatty acid R—CO in which R is a saturated, branched or unbranched $C_{7-21}$ alkyl group, B represents a $(C_nH_{2n}O)_k$ group in which n is an integer of from 2 to 4 and k has a value of from 1 to about 15, and C is a linear or branched residue of a diol selected from the group consisting of —O—$CH_2$—$CH(CH_3)$—O—, —O—$CH_2$—$CH_2$—$CH_2$—O—, —O$(CH_2)_4$—O—, —O—$CH_2$—$CH_2$—$CH_2$—O—$CH_2$—$CH_2$—$CH_2$—O—, and —O—$CH_2CH(CH_3)$—O—$CH_2$—$CH(CH_3)$—O—.

4. The composition of claim 3 wherein in formula (I), R is a saturated linear alkyl group containing 9 to 13 carbon atoms.

5. The composition of claim 3 wherein in formula (I), k has a value of 1 to 15.

6. The composition of claim 3, wherein in formula (I), k has a value of 4 to 10.

7. The composition of claim 3 wherein in formula (I), k has a value of 5.

8. The composition of claim 3 wherein in formula (I), n has a value of 2.

9. The composition of claim 3 wherein in formula (I), R is a linear alkyl group containing 9 carbon atoms, k has a value of 5, n has a value of 2 and C is a —O—$CH_2$—$CH(CH_3)$—O— group.

10. The composition of claim 3 wherein in formula (I), R is a linear alkyl group containing 11 carbon atoms, k has a value of 5, n has a value of 2 and C is a —O—CH$_2$—CH(CH$_3$)—O— group.

11. The composition of claim 3 wherein the additive has a cold cloud point below 12° C.

12. The composition of claim 3 wherein the additive is present in the composition in an amount of from about 0.1 to 30% by weight, based on the weight of the composition.

13. A process for hydrophilicizing synthetic polyolefin fibers comprising adding to the fibers an additive of the formula:

A—B—C—B—A     (I)

wherein A represents a residue of a fatty acid R—CO in which R is a saturated branched or unbranched C$_{7-21}$ alkyl group, B represents a group (C$_n$H$_{2n}$O)$_k$ in which n is an integer of from 2 to 4 and k has a value of from 1 to about 15, and C is a linear or branched residue of a diol selected from the group consisting of —O—CH$_2$—CH(CH$_3$)—O—, —O—CH$_2$—CH$_2$—CH$_2$—O—, —O—(CN$_2$)$_4$—O—, —O—CH$_2$—CH(CH$_3$—) —O—CH$_2$—CH(CH$_3$)—O—, and —O—CH$_2$CH$_2$CH$_2$—O—CH$_2$CH$_2$CH$_2$—O—.

14. The process of claim 13 wherein in formula (i), R is a saturated linear alkyl group containing 9 to 13 carbon atoms.

15. The process of claim 13 wherein in formula (I), k has a value of 1 to 15.

16. The process of claim 13 wherein in formula (I), k has a value of 4–10.

17. The process of claim 13 wherein in formula (I), k has a value of 5.

18. The process of claim 13 wherein in formula (I), n has a value of 2.

19. The process of claim 13 wherein in formula (I), R is a linear alkyl group containing 9 carbon atoms, k has a value of 5, n has a value of 2 and C is a —O—CH$_2$—CH(CH$_3$)—O— group.

20. The process of claim 13 wherein in formula (I), R is a linear alkyl group containing 11 carbon atoms, k has a value of 5, n has a value of 2 and C is a —O—CH$_2$—CH(CH$_3$)—O— group.

21. The process of claim 13 wherein the additive has a cold cloud point below 12° C.

22. The process of claim 13 where the additive is present in the composition in an amount of from about 0.1 to 30% by weight, based on the weight of the composition.

* * * * *